Feb. 4, 1930.  W. C. BRINTON  1,745,598
MOTOR TRUCK FOR FREIGHT HANDLING
Original Filed Nov. 21, 1913   4 Sheets-Sheet 1
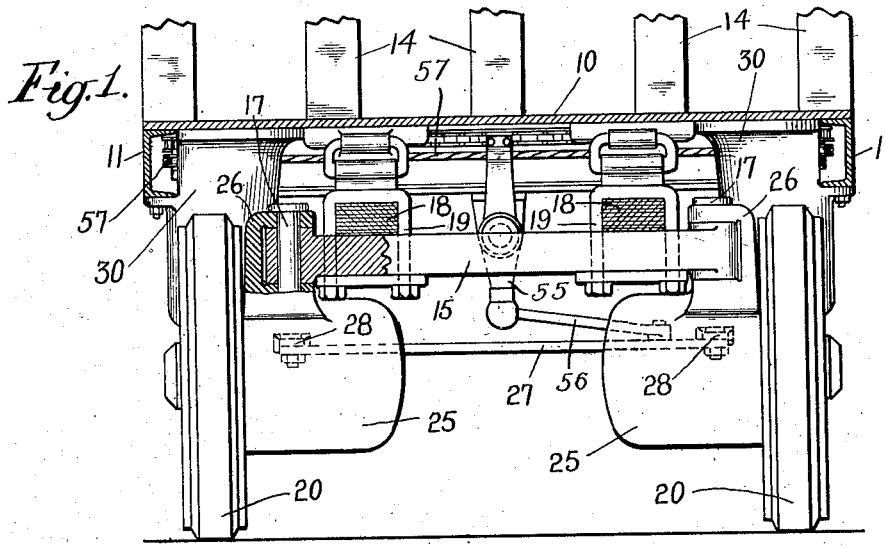
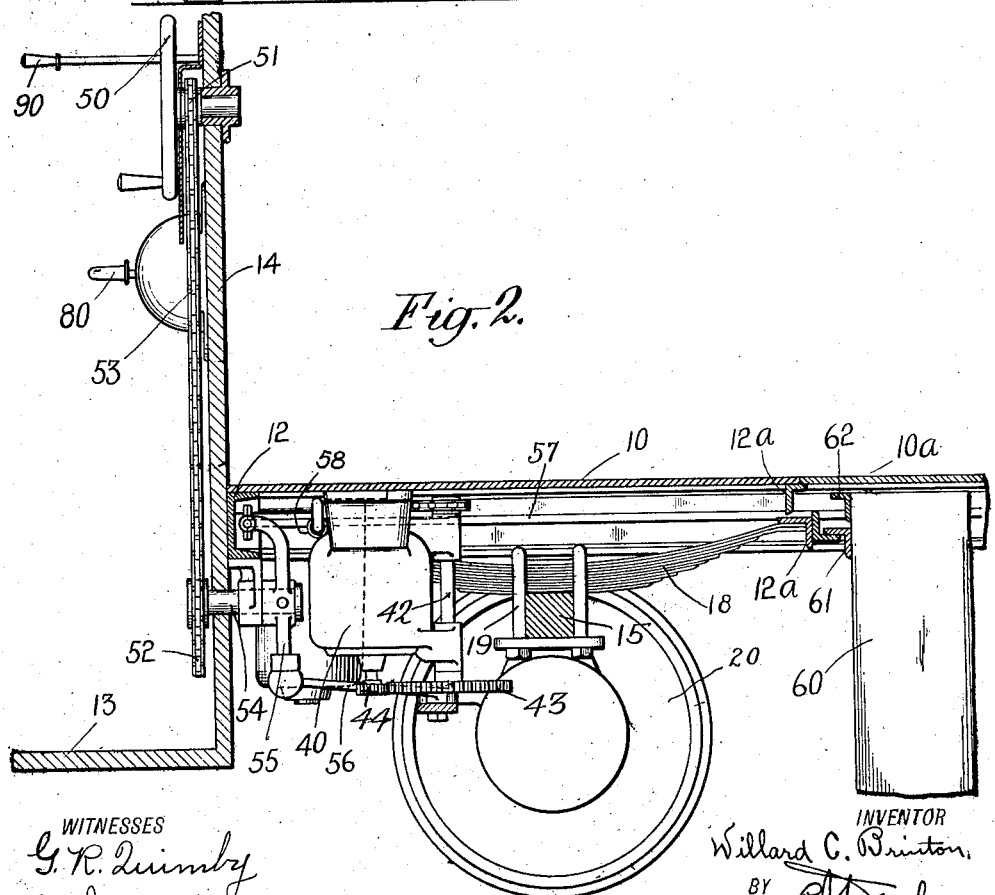
WITNESSES
G. R. Quimby
F. Graves
INVENTOR
Willard C. Brinton,
BY
R. J. Dearborn
ATTORNEY

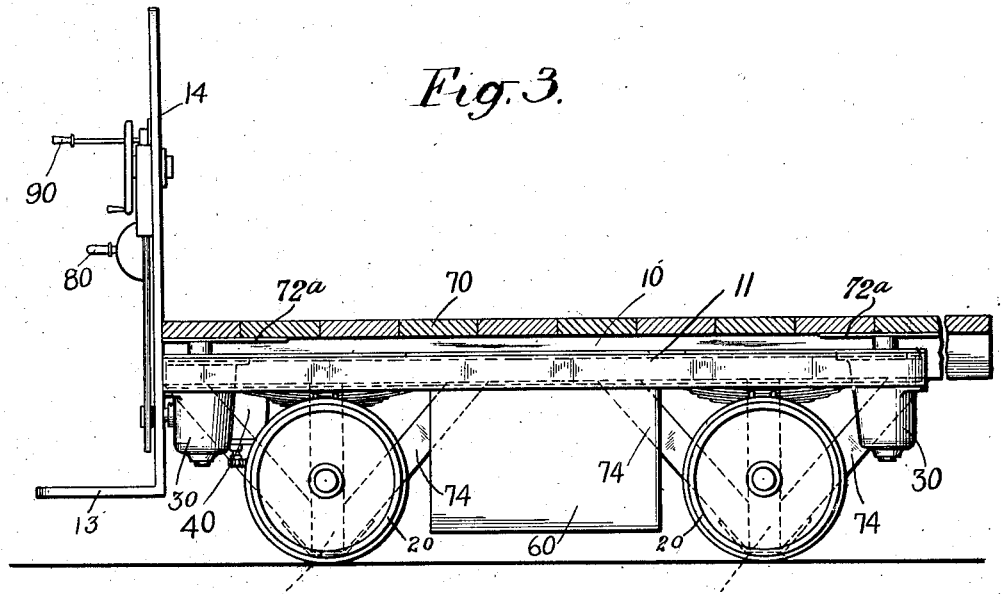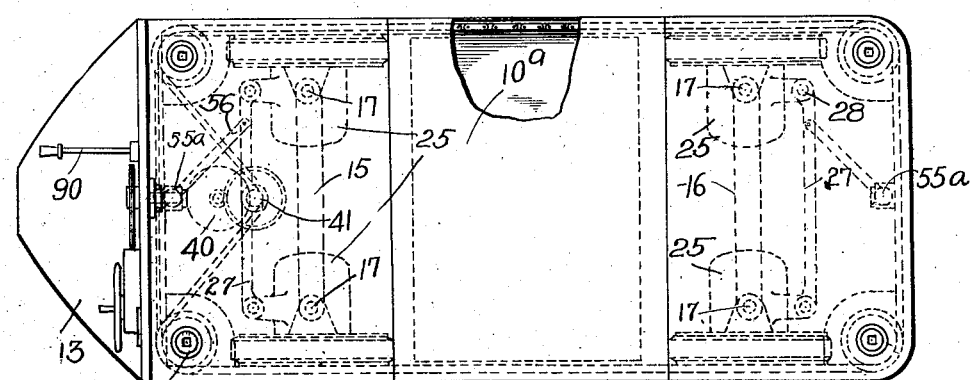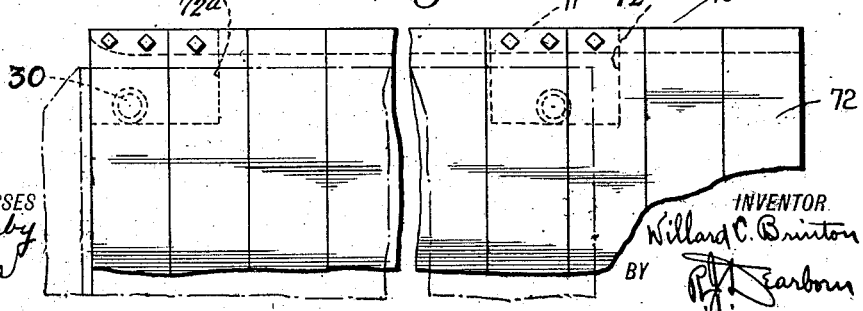

Feb. 4, 1930.  W. C. BRINTON  1,745,598
MOTOR TRUCK FOR FREIGHT HANDLING
Original Filed Nov. 21, 1913  4 Sheets-Sheet 3
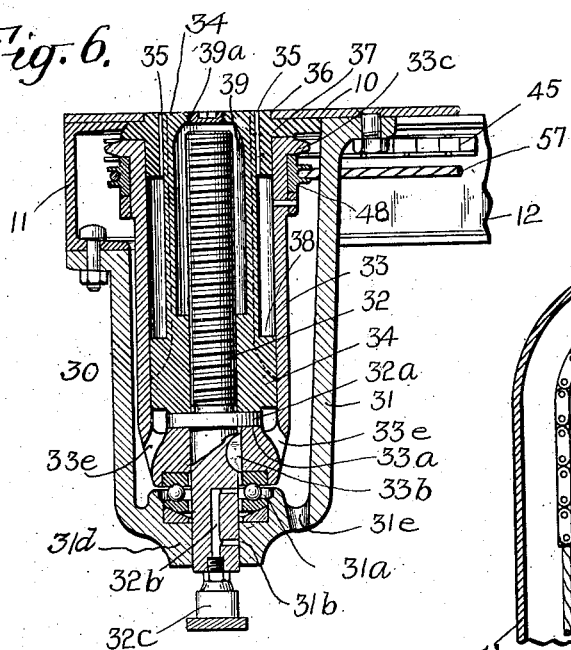
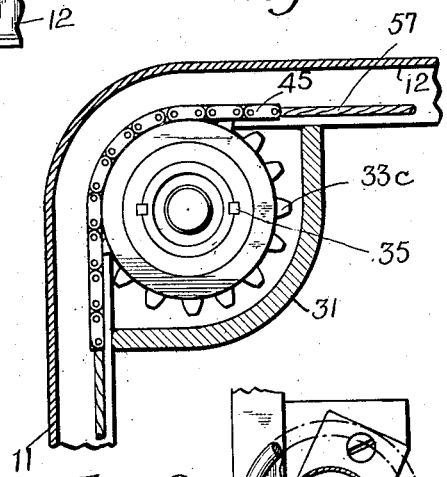
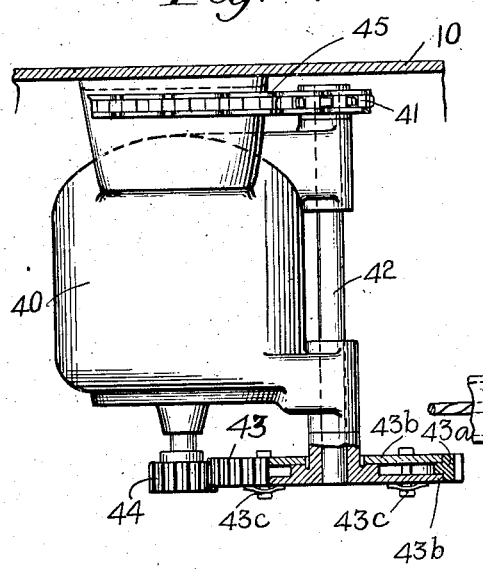
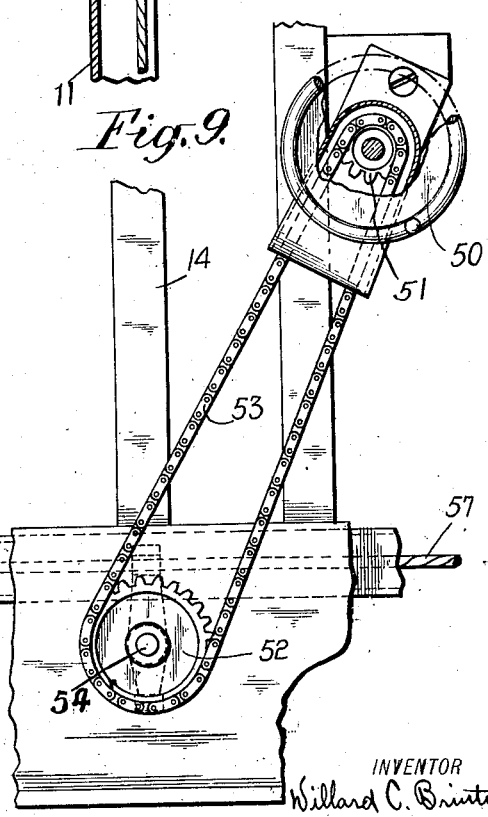
INVENTOR
Willard C. Brinton
BY
ATTORNEY Feb. 4, 1930. W. C. BRINTON 1,745,598
MOTOR TRUCK FOR FREIGHT HANDLING
Original Filed Nov. 21, 1913 4 Sheets-Sheet 4
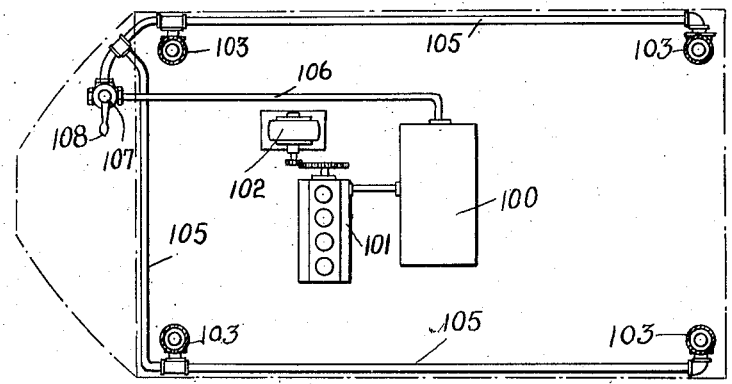
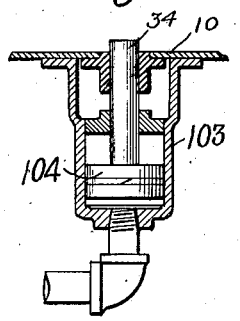
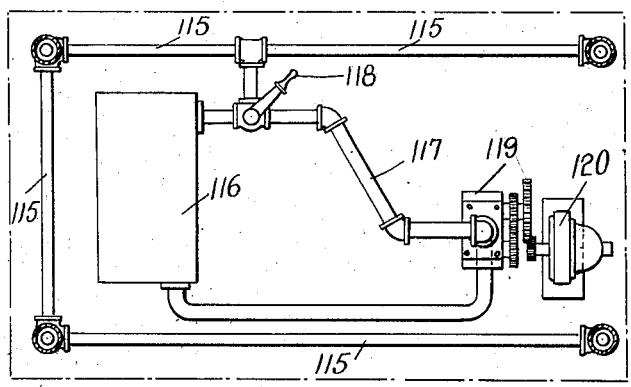
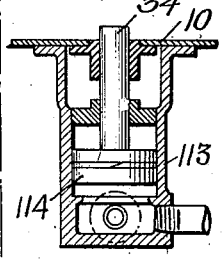
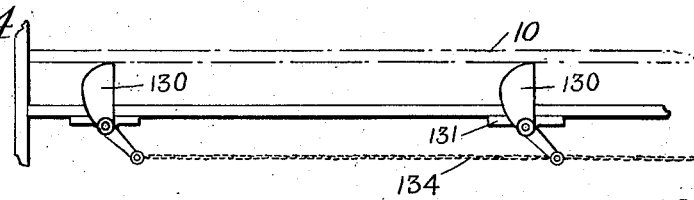
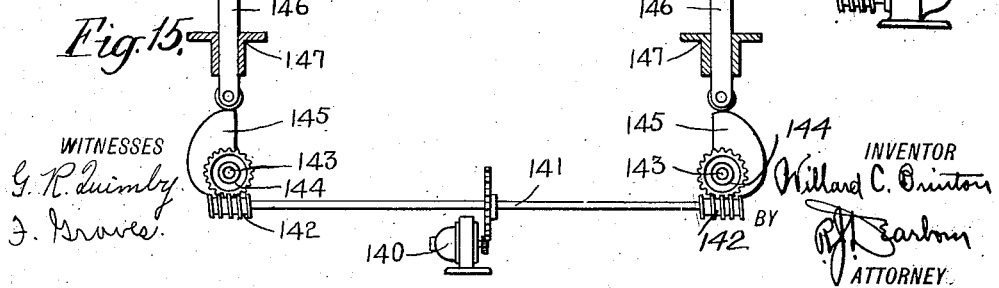

Patented Feb. 4, 1930

1,745,598

UNITED STATES PATENT OFFICE

WILLARD C. BRINTON, OF NEW YORK, N. Y., ASSIGNOR TO TERMINAL ENGINEERING COMPANY, INC., OF NEW YORK, N. Y., A CORPORATION OF NEW YORK

MOTOR TRUCK FOR FREIGHT HANDLING

Continuation of application Serial No. 802,192, filed November 21, 1913. This application filed April 10, 1918, Serial No. 227,934. Renewed August 14, 1923.

My invention relates to freight handling and has special reference to motor-operated trucks which are adapted for this purpose.

One object of my invention is to provide a particularly powerful and compact motor truck that shall be capable of handling freight economically not only on a dock or in a warehouse,—as for example in loading and unloading freight onto and from a ship or freight car,—but also over comparatively rough roads.

Another object is to provide auxiliary apparatus which shall be relatively inexpensive and largely increase the amount of work which a single truck is able to perform, with a view to keeping the relatively expensive motor truck actively in operation for a large proportion of the time.

Another object is to provide a truck, of the character above indicated, that shall exert a very large tractive effort in order that it may be able to climb steep grades under full load and haul trailers if desired. My invention does not, however pertain essentially to a locomotive, but on the contrary the truck of my invention is primarily intended to carry a load on its own back.

Still another object of my invention is to provide a truck that shall embody a plurality of jacks or hoisting devices for lifting a bench or platform or some similar immobile device, on which a load may be placed independently of the truck.

Another object of my invention is to provide a motor vehicle having hoisting jacks and equipped with a hoisting motor for actuating the jacks and an interposed slip or friction connection to limit the forces transmitted and prevent accidents, such as stripping of the gear teeth when the jacks are fully elevated or lowered.

Another object is to provide a motor vehicle having hoisting jacks arranged to be concurrently actuated, a hoisting motor therefor and interposed non-overhauling gearing which is arranged and adapted to support full load in any position of elevation, thereby making it necessary to apply power to the hoisting motor only for actually hoisting or lowering.

Without sacrificing any of the aforesaid objective results, it is a further object of my invention to arrange for the ready manipulation and control of the truck, the turning of sharp corners and the carrying of a wide diversity of merchandise, either directly on the platform of the truck, or on an auxiliary bench or platform supported on the truck jacks.

It has been my aim to provide a motor vehicle having larger wheels and much greater power than terminal or baggage trucks used hitherto in order to adapt the vehicle to travel over rough roads as well as on the terminal and warehouse floors. Furthermore, I provide a vehicle arranged to elevate and carry loading platforms which have decks at the usual height for loading freight cars. I also arrange the storage battery where it does not reduce the loading capacity of the vehicle and where its weight is equitably distributed on the driving wheels. The control means for the hoisting motor is close to the controller which governs the vehicle motor and the driver can readily manipulate both together. For example, he may lower his hoists as he is bringing his truck to a stop and may start before his load is fully elevated.

Other objects and advantages of my invention will be set forth hereinafter, and I will describe my invention in the following specification and point out the novel features thereof in appended claims.

In the drawings,—

Figure 1 is a transverse sectional elevation looking forward from behind the front axle, of a truck arranged and constructed in accordance with my invention.

A longitudinal section of the front part of the same truck is shown in Figure 2.

Figures 3 and 4 are respectively a side elevation and a plan view on a smaller scale of the complete truck, an auxiliary bench or platform being shown in Figure 3 in longitudinal section, supported in position on the truck jacks.

A partial plan view of the auxiliary bench or platform is shown in Figure 5.

Figure 6 is a sectional elevation and Figure 7 is a plan view on a larger scale, of one of the hoisting jacks which form parts of the truck.

A side elevation of the hoisting motor and its gearing is shown in Figure 8.

Figure 9 shows a steering wheel and its gearing.

A modification of my invention, arranged to utilize compressed air for actuating the jacks, is shown diagrammatically in Figure 10, one of the air operated jacks being shown in section in Figure 11.

Figure 12 is a diagrammatic view corresponding to Figure 10 of another modification, arranged to operate by hydraulic pressure, Figure 13 being a section through one of the hydraulic jacks.

Still other modifications are shown in Figures 14 and 15 in which cams form parts of the jacks.

It will be evident to those skilled in the art to which this invention pertains, that various mechanical and electrical means may be utilized for accomplishing the same general result, and while I consider the arrangement of Figures 1 to 9 inclusive to be preferable, the modifications are included in order to indicate the scope rather than to restrict the invention, consequently I intend that only such limitations be imposed as are indicated in the appended claims.

Referring to Figures 1 to 9 inclusive of the drawings—

The truck here shown comprises a platform 10, front and rear axles 15 and 16, driving wheels 20, wheel motors 25, a plurality of lifting jacks 30, a hoisting motor 40, a storage battery 60, and suitable steering and control mechanisms.

As shown in Figures 3 and 5, the truck is adapted to be used in conjunction with a plurality of auxiliary benches or platforms 70 and in order that it may be economically utilized for the purpose for which it is intended, the vertical height of the truck platform must be very small. To enable the truck to make sharp turns, each of the four wheels is arranged to be tilted through an angle of substantially forty-five degrees. In fulfilling the aforesaid conditions and at the same time providing relatively powerful motors, and a large storage battery from which the motors may be supplied with energy, the careful arrangement of all of the apparatus on the truck is of great importance.

The platform 10 is composed of a frame built up of channel beams 11 set on edge at the respective sides, with the smooth web surface exposed, and sills 12 and transverse angle irons 12$^a$. The floor of the platform is preferably composed of sheet steel and is riveted or otherwise suitably secured to the frame. At one end of the truck, secured to one of the end sills 12 are a plurality of vertical stakes 14 which extend materially above the floor of the platform and a step 13, on which the truck operator may stand.

The truck is adapted to operate in either direction with equal facility, but for convenience in description, the end having the stakes and step is herein referred to as the front of the truck.

The front and rear axles 15 and 16 are similar to each other and are interchangeable. They are each connected at their respective ends to trunnions 26, which are a part of the wheel motor frames, by steering knuckle pins 17. The trunnions 26 are formed on the tops of the motors, in order to permit the use of motors having relatively large outside diameters while maintaining the necessary clearance from the ground with relatively small wheels. This arrangement constitutes an independent invention and forms the subject matter of my copending application, Serial Number 117,032 filed August 26, 1916, for motor vehicle, which is in part a division of application Serial No. 802,192, filed Nov. 21, 1913, of which this application is a continuation.

The motors may be gear-connected to the wheels by suitable reduction gearing of any well known type, which forms no part of my present invention and consequently is not illustrated.

Each wheel with its motor acts as a unit and the two wheels at the respective ends of the truck are interconnected by steering links 27, which are pivotally connected to suitable projections 28 on the sides of the motor frames.

The platform is supported from the front and rear axles by semi-elliptical springs 18 which are connected to the axles by yokes 19.

As clearly shown in Figures 2 and 9, the steering mechanism comprises a hand wheel 50 which is arranged to operate in a plane parallel to the plane of the stakes 14 so that it may be conveniently manipulated by an operator when standing on the step 13. It is connected by sprockets 51 and 52 and an interposed chain 53 to a shaft 54 which extends inwardly below the floor of the platform, and which carries a rocking arm or lever 55. This lever is connected at its lower end by a ball and socket joint and a link 56 to one of the steering cross rods 27. At its upper end it is attached to a steering cable 57.

At the opposite end of the truck, is another rocking arm or lever 55$^a$ similarly connected to the adjacent steering link 27 and attached to the same cable 57 at its upper end. The cable 57 extends over guide sheeves 58 located as hereinafter explained, near the corners of the platform frame and by this means it is kept in the side channels 11 where it operates freely without reducing the space available for the storage battery 60.

By turning the hand wheel 50, the cable 57 is moved in one direction or the other so as to swing the wheels on the steering knuckle pins, and thus effect a maximum turning of the truck with a minimum adjustment of the wheels. The links 56 interconnect that portion of the steering mechanism which is supported upon the wheel structures and which is, therefore, a part of the unsprung weight of the truck with the portion carried by the frame and supported at an angle to the longitudinal center line of the truck, (see Figure 1) and thus the effect on the steering of variations in the springs, caused by road irregularities, is materially reduced.

The middle section of the platform 10 consists of a removable steel plate $10^a$ which is directly above the storage battery. The battery box is provided with a lower set of transverse angle irons 61 which are arranged to hook onto ledges on the transverse beams $12^a$, when the battery is lowered into position. An upper set of transverse angle irons 62 are located near the upper edge of the box and constitute a ready means for engaging crane hooks or other suitable tackle for lifting the battery out of the truck.

One of the principal features of my invention is the jacks or hoisting means 30. These are located close to the side of the frame and near its ends, being bolted to the channels 11. In other words they are located near the four corners of the frame.

When they occupy their lowered positions, the top surfaces of the jack are substantially flush with the floor of the platform 10 and consequently they do not in any way interfere with the utilization of the platform of the truck for carrying loads placed directly upon it. Furthermore the arrangement is such, that a relatively smooth, unobstructed surface is presented except for a small recess in the center of each jack, and consequently there is no oportunity for dirt or foreign matter to damage the jack, no matter what is piled onto the floor of the platform.

The jacks, which are covered per se in my Patent No. 1,267,051, of May 21, 1918, the application for which was copending herewith, are similar to each other and each comprises (see Figures 6 and 7) a stationary bracket 31 which preferably has the general form of a cup, a spindle 32, an actuating thimble 33 and a hoisting quill 34 which is arranged to slide up and down in the thimble 33 but is prevented from turning by keys 35.

The floor plate 10 is provided for each jack with an opening 36 through which the hoisting quill operates, the floor plate being reinforced at the opening by a flanged ring 37 which is slotted to receive the keys 35 and constitutes a bearing for the upper end of the member 34. The lower end of the quill 34 is enlarged to fit the hollow cylindrical opening in the thimble 33, the arrangement being such that an annular shoulder 38 is provided to limit the outward movement of the quill 34 by engaging the flanged reinforcing ring 37. The quill 34 is provided with a central opening which is constricted near its lower end and is tapped to engage the threaded portion of the spindle 32. The upper part of the quill is hollow to form a grease-cup 39 and is closed by a plug $39^a$.

The spindle 32 has a collar $32^a$ which rests on a shoulder $33^a$ of the thimble 33. The lower part of the spindle which is below the collar, is preferably pressed into a suitable hole in the bottom of the thimble and is firmly secured to the thimble by a key $33^b$ or other suitable means. An annular thrust bearing $31^a$ is mounted within the cup-shaped bracket 31 at the bottom, and supports the thimble 33 and the spindle which is secured to it.

The thimble at its upper end, is fitted onto the lower part of the flanged ring 37 which constitutes a guide bearing. Opposite this bearing, near the upper end of the thimble, is a sprocket wheel $33^c$ which is engaged by a hoisting chain 45.

Rotatably mounted on the thimble adjacent to the sprocket wheel is a sheave 48 which constitutes a guide for the steering cable 57.

The lower end of the spindle is guided by a bearing $31^d$ in the bracket 31, the bearings $31^a$ and $31^b$ being supplied with lubrication through grease passages $31^b$ and $32^b$ which communicate at the lower end of the spindle with a compression grease cup $32^c$.

Before proceeding with the description of the truck and its operation, the operation of a single jack will be included as follows: The thimble 33 and the spindle 32 which are secured to each other, are rotated by the co-operation of the sprocket chain 45 with the sprocket wheel $33^c$. Since the member 34 is screwthreaded onto the upper end of the spindle and is prevented from turning by the keys 35, the rotation of the spindle in one direction causes the member 34 to slide upwardly within the cylindrical opening of the thimble.

When the member 34 is in its lowered position, in which it engages the collar $32^a$ of the spindle, as shown in Figure 6, the top of the member is flush with the floor plate 10 and the extent to which the member may be raised is limited by the engagement of the shoulder 38 with the lower end of the flanged reinforcing ring 37.

In order to prevent the accumulation of dust and dirt in the jack, the thimble 33 is provided near the bottom, with lateral openings $33^e$ through which dust may fall into the cup-shaped bracket 31. This bracket is provided with one or more discharge openings $31^e$ which open downwardly and will permit the dirt to escape without danger of any considerable amount of dirt entering from below.

As shown in Figure 6, the sprocket wheel $33^c$ and the sheave 48 both extend into the adjacent channel 11 of the truck frame. This permits the chain 45 and the cable 57 to extend from one of the jacks at the front end of the truck to one of the jacks at the rear without decreasing the space available for a storage battery which is made to fit closely between the side channels.

The chain 45 as shown in Figure 4, extends completely around the truck platform except at the front where it extends into engagement with a sprocket 41 which forms a part of the hoisting motor gearing.

The hoisting motor 40 is mounted on the under side of the platform near the front with its shaft vertical and it is suitably connected to the sprocket wheel 41 by a back gear shaft 42, a gear wheel 43 and a pinion 44. Other gearing may be employed, but I prefer to utilize a relatively high speed motor in order that a motor of small dimensions may exert a powerful lifting force at each of the four hoisting jacks.

In order to avoid possibility of injuring the hoisting motor or the gearing when the hoisting members reach the ends of their strokes, I employ a friction drive mechanism. For example the gear wheel 43 may comprise a rim 43$^a$ which is adapted to slip relative to friction disks 43$^b$, the disks being clamped together by bolts 43$^c$. The operator is provided with a control lever 80 for the hoisting motor 40, a second control lever 90 by means of which he governs the operation of the wheel motors 25. The steering of the truck is effected as already pointed out by means of the hand wheel 50. The truck and its motors are so arranged and constructed that the truck may be operated up a very steep grade on a comparatively narrow platform or gangplank and the permissible swing to the wheels is such that the truck may make a turn having its center of curvature near the center of one side of the truck platform.

From the foregoing description the general utility of the truck will be apparent and therefore, while its field of usefulness is by no means limited to any particular class of service, I will now describe more in detail the utilization of the truck in connection with a large number of relatively stationary benches or platforms, such as the platform 70.

The platform illustrated in Figures 3 and 5 comprises a pair of longitudinal beams 71, which are tapered off at their respective ends on their inside surfaces so that they constitute guideways for facilitating the backing of the truck under the platform, and transverse planks 72, which are bolted or otherwise firmly secured to the beams 71 on leg 73. The cross planks are preferably cut off at their ends flush with the outer surfaces of the beams 71 which, as above inferred, are spaced apart by a distance slightly greater than the width of the truck platform. The height of the platform is slightly greater from the floor line to the under side of the cross planks than the height of the platform surface of the truck and for the same reason, the legs 73 are firmly secured to the longitudinal beams 71 and are reinforced by braces 74 in such a manner as not to interfere with the truck entering the space under the platform.

The platform is shown as reinforced at the points where it is engaged by the lifting jacks by the bearing plates 72$^a$ secured between the sills and the under sides of the planks 72 (Figs. 3 and 5) which form bearings or contact members to be engaged by the jacks and serve to distribute the load.

Attention is directed to the fact that the truck platform extends only slightly beyond the truck wheels in a lateral direction and that the sides of the platform are smooth surfaces rendering the manipulation of the truck with or without the stationary bench or platform particularly easy. For the same reason, the bench has smooth edge surfaces and only extends a comparatively short distance beyond the sides of the truck when it is mounted on it. It is desirable in many cases, however to have the stationary bench considerably longer than the truck in order to increase the carrying capacity of the bench.

The distance between the legs of the bench from front to back corresponds to the wheel base of the truck and the distance from one set of legs to the front end of the bench corresponds to the distance from the front wheel centers to the stakes 14 on the truck.

If the bench is approximately equal in length to the truck, the longitudinal beams of the bench will be tapered off at both ends and it will be immaterial under which end the truck is backed, but if the bench is materially longer than the truck, only one end of the longitudinal beams will be tapered off since the truck will be preferably backed under the bench in such position that when the end of the bench engages the stakes, the legs of the bench will be located substantially opposite the wheel centres of the truck.

When the truck is in position under the bench, the truck operator manipulates a suitable control lever 80 for causing the hoisting motor 40 to operate. The operation of this motor moves the chain 45 so as to cause all of the hoisting members to rise and thereby lift the bench off the floor. This may be accomplished in a very short time and the truck, loaded with the bench and with whatever has been previously placed on the bench, may proceed to a greater or less distance and quickly set down its load by merely operating the hoisting motor in the reverse direction.

It will be readily understood that a single truck used in conjunction with a number of benches may accomplish many times the amount of work which a single truck could accomplish if it is necessary to keep the truck waiting while a load of ordinary merchandise in bags, boxes or crates or in any form is being loaded and unloaded directly onto or from its platform. At the same time the truck is constructed to carry a load directly on its own back.

By designing the relatively stationary bench or platform with supporting legs, which are arranged opposite the wheel centres, it is possible to operate over relatively rough surfaces or roadways without raising the bench or platform through any great distance when it is lifted by the truck. For example, one or more of the truck wheels may fall into a depression in rough roadways, but since the bench legs are opposite the wheel centres, they will go into the same depression and there is no danger of their coming in contact with the ground or floor surface on which the truck is operated. At the same time the lifting strike of the jacks is reduced and consequently they may more readily be arranged and adapted for handling very heavy loads. The center of gravity of the load on the platform is kept materially lower by reason of the fact that it is only raised through a short distance by the action of the jacks. Even the full stroke of the jacks is not the measure of the rise for the truck springs and tires yield and permit the truck frame to be somewhat depressed. It will be seen that the location of the relatively heavy storage battery between the pairs of wheels and below the platform level imparts great stability to the truck. This feature is of importance in practice and renders the truck capable of raising large loads which sometimes are unevenly disposed upon the platform.

The truck of my invention is particularly arranged and adapted for severe service conditions which have not hitherto been successfully met and I believe that it is broadly new to provide a vehicle having a plurality of motor driven lifting jacks or equivalent devices as and for the purpose set forth herein.

The modified arrangement shown in Figures 10 and 11 comprises in general, a compressed air storage tank 100, a compressor 101, a driving motor 102 therefor, and a plurality of cylinders 103 in which hoisting pistons 104 operate. Suitable pipe connections 105 join the cylinders 103 to a supply pipe 106 in which a control valve 107 is located. The supply pipe is connected to the storage tank 100. The pistons may be raised simultaneously by merely throwing the control valve lever 108 so as to admit compressed air to the cylinders 103 under the pistons. To lower the pistons the valve lever is thrown to such a position as to exhaust the cylinders 103. This arrangement has the advantage that no power is required for lowering the pistons. The pistons here shown constitute the hoisting members.

In Figures 12 and 13 is illustrated a hydraulic arrangement which comprises cylinders 113 and pistons 114 which are located and connected somewhat as the cylinders and pistons of the arrangement shown in Figures 10 and 11, all of the cylinders being joined by pipe connections 115, liquid being supplied to or withdrawn from the cylinders by connecting them either directly to a pump 119 or to a storage tank 116. This is accomplished by throwing a two-way valve 118 from one position to the other. The pump 119 is actuated by a motor 120 which may be started and stopped by any suitable controller and when operating draws liquid from the tank 116 and forces it into the cylinders 113.

Other mechanical arrangements for elevating a plurality of hoisting members which forms parts of hoisting jacks, may be utilized, as, for example, a plurality of cams 130 may be pivotally mounted on brackets 131 as shown in Figure 14 and constitute hoisting jacks. With this arrangement a winding drum 132 is rotatably mounted near the rear of the truck frame and the hoisting motor is suitably connected thereto. At each side of the truck a cable is connected to a pair of the cams 130 and is wound onto the drum. When the motor is operated the cables are so pulled as to raise the cams which are adapted to extend through suitable holes or slots in the truck platform. The cams may be arranged to swing in any direction but when mounted as shown, they tend to move the stationary bench or platform against the stakes at the front and so assist in properly placing the bench on the truck.

In another arrangement, a hoisting motor 140 (see Figure 15) is geared to a shaft 141 to which are secured a pair of worms 142. Assuming that the shaft 141 is transverse of the truck, a pair of longitudinal shafts 143 are located near the respective sides of the truck and are provided with worm wheels 144 which establish an operative connection with the shaft 141. A plurality of cams 145 are secured to the shafts 143 and are adapted to actuate hoisting members 146 which are arranged to slide up and down in guide bearings 147.

The hoisting jacks used in the arrangement of Figures 1 to 9 inclusive have the advantage of being non-overhauling that is, they will support the load in any position independently of the motor which operates them to raise and lower.

The arrangements of Figures 14 and 15 also possess this advantage because of the worm gearing interposed between the motor and the hoists in each case.

Attention is further directed to the fact that the lever 80 which covers the hoisting motor 40, is located close to the lever 90, by which the operator governs the vehicle driving motors and consequently the two motors can be regulated with reference to each other so as to save considerable time in manipulation of the load. For example, as already pointed out, the operator may start the vehicle as soon as the load is elevated sufficiently to let the platform legs clearly touch the ground without waiting for the load to be completely elevated. On the other hand, the operator may start the hoisting motor to lower the load before the vehicle is entirely at rest, if desired.

Other equivalent arrangements may of course be utilized within the spirit and scope of my invention.

In cases where it is desirable to utilize very low stationary benches or platforms, the truck may be modified to comprise a single pair of driving wheels, over which the battery may be mounted, and a body with a low platform extending backwardly from the driving axle and supported at the rear on a pair of small wheels. Truck bodies of this form are well known and need not be illustrated.

Instead of providing each of the truck wheels with a driving motor the truck may be driven by one or more motors arranged and operatively connected to one or more of the wheels in any suitable way. Furthermore, it is not necessary that the truck shall have four wheels although I consider this arrangement preferable.

What I claim is:

1. A motor truck having a plurality of wheels, driving means therefor, means for pivotally mounting each wheel, a plurality of hoisting jacks disposed near the respective corners of the truck, means for actuating the hoisting jacks concurrently, a guide means rotatably mounted on each jack and steering means for simultaneously turning the wheels of the truck arranged to co-operate with the guide means.

2. A motor truck having a plurality of wheels, a driving motor for each wheel, means for pivotally mounting each wheel with its motor, a plurality of hoisting jacks disposed near the respective corners of the truck, means for actuating the hoisting jacks concurrently, a pulley rotatably mounted on each jack and a steering cable for simultaneously turning the four wheels of the truck arranged to co-operate with the guide pulleys.

3. A motor truck having a plurality of wheels, a driving motor for each wheel, means for pivotally mounting each wheel with its motor, a plurality of hoisting jacks disposed near the respective corners of the truck, a sprocket wheel and guide pulley on each jack, a motor, an interposed hoisting chain co-operating with each of the sprocket wheels for concurrently actuating the jacks, a steering means and a cable connected to the steering means and co-operating with each of the guide pulleys.

4. A truck comprising a platform having side channels arranged with their smooth web surfaces outward, a plurality of hoisting jacks secured to the platform adjacent to the side channels, a hoisting motor and means for connecting the jacks to be concurrently operated by the motor, guide pulleys rotatably mounted on the jacks and extending into the side channels, a steering cable co-operating with the pulleys, said means and said cable being disposed in said channels.

5. A motor truck having a plurality of wheels, a driving motor, means for pivotally mounting the truck wheels, a plurality of hoisting jacks, means for actuating the hoisting jacks concurrently, a guide means rotatably mounted on each jack, and truck steering means for simultaneously turning the wheels of the truck arranged to cooperate with the guide means.

6. A truck comprising a platform having side channels arranged with their smooth web surfaces outward, a plurality of hoisting jacks secured to the platform adjacent to the side channels, a hoisting motor and means for connecting the jacks to be concurrently operated by the motor, guide pulleys extending into the side channels, a steering cable cooperating with the pulleys, said means and said cable being disposed in said channels.

In witness whereof, I have hereunto set my hand this 29 day of March, 1918.

WILLARD C. BRINTON.